United States Patent [19]

Crouch et al.

[11] Patent Number: 4,621,230

[45] Date of Patent: Nov. 4, 1986

[54] ANTI-TAMPER FASTENER SHIELDING DEVICE

[75] Inventors: Jack S. Crouch, Charlotte; Edward F. Zink, Matthews, both of N.C.

[73] Assignee: Carolina Moldings, Inc., Charlotte, N.C.

[21] Appl. No.: 555,033

[22] Filed: Nov. 23, 1983

[51] Int. Cl.$^4$ .................. F16B 41/00; G09F 3/00
[52] U.S. Cl. .................. 324/110; 292/307 B; 292/321; 411/373; 411/910
[58] Field of Search .............. 411/371, 372, 373, 374, 411/375, 376, 377, 378, 910, 911; 24/662; 220/307, 214; 215/355; 292/307 R, 307 B, 320, 321, 327; 261/DIG. 38; 324/110

[56] References Cited

U.S. PATENT DOCUMENTS

| | | | |
|---|---|---|---|
| 998,878 | 7/1911 | Dinsmoor | 292/320 |
| 1,186,760 | 6/1916 | Elliot | 292/307 B |
| 1,887,557 | 11/1932 | Keidel | 292/307 B |
| 2,033,371 | 3/1936 | Benaggio | 292/307 B |
| 2,081,627 | 5/1937 | Heinrich | 292/307 R X |
| 2,082,068 | 6/1937 | Lewis | 292/307 R X |
| 2,706,065 | 4/1955 | Stone | 220/307 |
| 3,385,466 | 5/1968 | Hook et al. | 220/307 |
| 3,425,313 | 2/1969 | Villo | 411/373 |
| 3,734,579 | 5/1973 | Schumacher | 220/307 |
| 3,885,492 | 5/1975 | Gutshall | 411/373 |
| 4,018,111 | 4/1977 | Goldhaber | 411/910 X |
| 4,037,515 | 7/1977 | Kesselman | 411/910 X |
| 4,065,946 | 1/1978 | Loynes et al. | 70/232 X |
| 4,136,598 | 1/1979 | Hughes | 411/372 |
| 4,214,505 | 7/1980 | Aimar | 411/373 |
| 4,225,165 | 9/1980 | Kesselman | 411/910 X |
| 4,324,516 | 4/1982 | Sain et al. | 411/910 X |
| 4,374,509 | 2/1983 | Kawabata | 292/307 B |

FOREIGN PATENT DOCUMENTS

| | | | |
|---|---|---|---|
| 133456 | 7/1949 | Australia | 411/373 |
| 2239146 | 2/1925 | France | 411/378 |
| 285825 | 9/1952 | Switzerland | 292/307 R |
| 1438171 | 6/1976 | United Kingdom | 411/373 |

Primary Examiner—Thomas J. Holko
Attorney, Agent, or Firm—Shefte, Pinckney & Sawyer

[57] ABSTRACT

A device for assembly with a bolt or screw upon installation thereof to prevent tampering therewith, including a jacket member for encircling the enlarged fastener head with a collar portion for disposition adjacent its underside to clamp the jacket member in place upon tightening of the fastener and a cap member configured to fit within the jacket member to enclose the fastener head therewithin. A rounded annular channel is formed within the anterior wall of the jacket member and a square annular rib is formed on the outer surface of the cap member to provide a snap-tight interference fit therebetween. The interior jacket wall and the outer cap surface are also tapered at slightly differing angles to provide a supplementary interference friction fit. The snap-fit between the jacket and cap members is sufficiently strong that they cannot be separated using conventional tools without damaging or destroying the members. A special tool is provided for authorized separation of the jacket and cap members.

25 Claims, 7 Drawing Figures

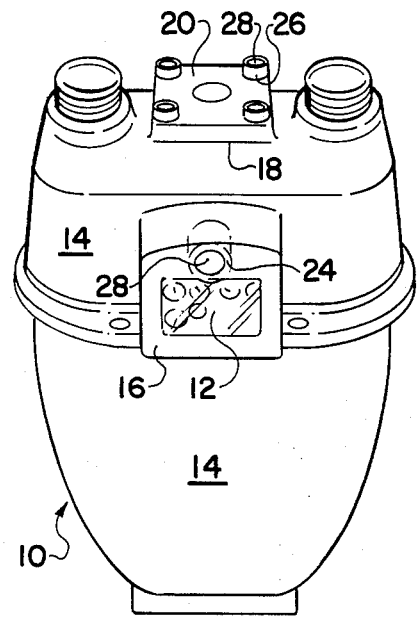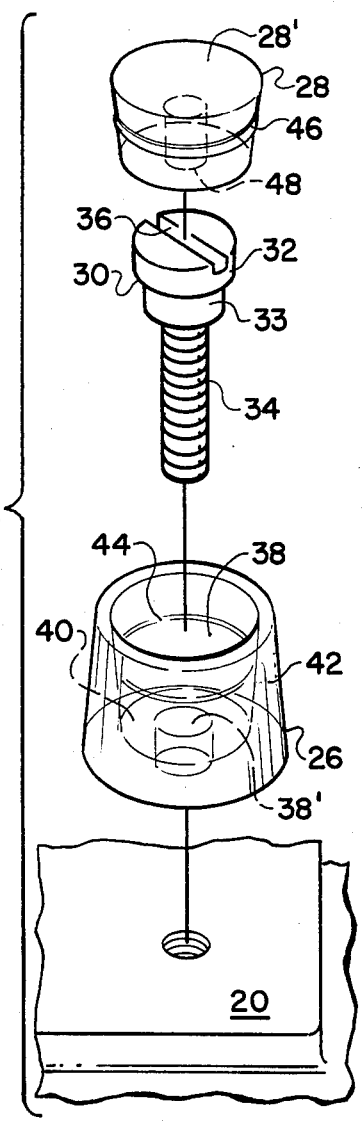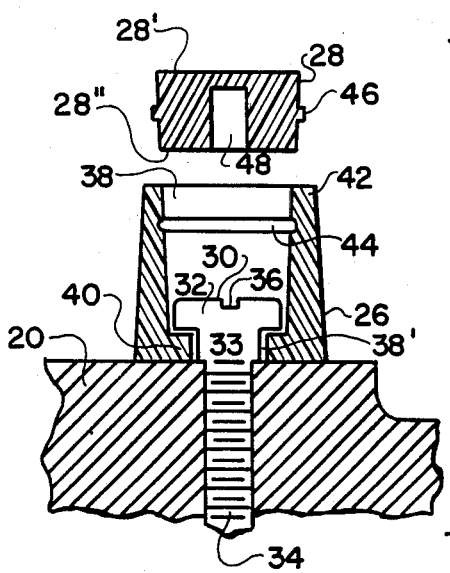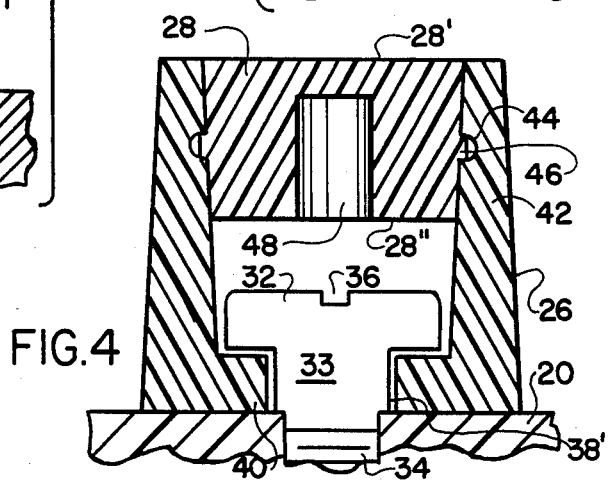

ANTI-TAMPER FASTENER SHIELDING DEVICE

BACKGROUND OF INVENTION

The present invention relates to devices for shielding bolts, screws and like fasteners from unauthorized access thereto to deter an enable detection of tampering therewith.

Because of the virtually universal use of bolts, screws and the like for all types of fastening uses and the wide availability for wrenches and similar tools adapted for affixation and removal thereof, unauthorized tampering with exposed bolts and screws, particularly in public areas, is a significant, ongoing problem, resulting each year in substantial losses due to theft, vandalism, damage and the like. As only one example of this constantly increasing problem, public utility companies are increasingly experiencing losses due to tampering with usage meters accomplished by the ready removal of the meter cover or other shroud by simple and easy loosening and removal of the retaining bolts or screws. Similarly, vending machines are commonly vandalised by unauthorized tampering with bolts and screws employed in the construction thereof. Many other examples of this problem are too numerous to list herein exist.

While careful design engineering enables the minization of exteriorly accessible bolts and screws in machinery and devices in which unauthorized tampering may be a problem, this solution is not always feasible and, in any event, it is nevertheless inevitable that at least some bolts and screws will be accessible to unauthorized tampering. In the past, various types of covers, caps, plugs and the like have been developed for shrouding otherwise accessible bolts and screws to prevent unauthorized access thereto. Examples of such devices are disclosed in U.S. Pat. Nos. 1,296,165; 3,065,662; 3,174,383; 3,298,272; and 3,492,841. However, it is not believed that such devices have ever been widely accepted and come into common use, presumably because such devices are susceptible to disassembly or other contravention without considerable difficulty.

One such device which has achieved some degree of use is the GUARD-NUT brand device marketed by Rally Enterprises, Inc., of Mill Valley, Calif. The GUARD-NUT device is particularly designed for use in conjuction with bolts used on utility meter devices and basically provides a bolt having a breakaway head adapted to be sheared off the bolt stem upon tightening to a predetermined degree of torque and a sleeve adapted to encircle the remaining end portion of the bolt to prevent access thereto. This device, while effective to prevent tampering with the bolt, also essentially prevents authorized removal of the bolt since the remaining end portion thereof provides no means of accepting any type of common or special tool. Thus, to remove the bolt for authorized purposes, it is necessary to destroy it and its protective sleeve by cutting or drilling.

In contrast, the present invention provides a novel apparatus adapted to shield the securing head of a fastener to prevent unauthorized access thereto without detectably damaging the components of the apparatus, whereby access to the fastener is substantially deterred on one hand and, in the event tampering occurs, is susceptible of ready detection on the other hand, while the apparatus is also adapted for easy disassembly using a specially designed tool to permit ready access to the fastner head for authorized removal.

SUMMARY OF THE INVENTION

Briefly described, the apparatus of the present invention is adapted for assembly with a fastener of the general type having a stem and an enlarged head during use of the fastener. The apparatus includes an annular collar member for extension therethrough of the fastener stem and for disposition adjacent the underside of the fastener head, and a closure member which mates with the collar member for cooperatively enclosing the fastener head to prevent access thereto. A resilient snap arrangement is provided on the collar member and the closure member for gripping affixation thereof together by a resilient snap-fit, thereby for shielding the fastener head for preventing unauthorized access thereto without detectably damaging one or both of the collar and closure members.

In the preferred embodiment, the collar member forms a jacket for the fastener head, having a housing portion having an opening therethrough for receiving the fastener head to be encircled by the housing portion and having an annular collar portion constricting the opening for extension through the collar portion of the fastener stem and for disposition of the collar portion adjacent the underside of the fastener head. The closure member preferably is formed as a cap member adapted to fit in the opening of the housing portion in flush relation therewith. The fastener preferably has a shoulder portion intermediate its head and its stem which shoulder portion is of a reduced cross-sectional size from the head. The collar portion of the jacket member is of an axial dimension slightly smaller than the shoulder portion and of a radial dimension slightly greater than the shoulder portion but less than the enlarged head of the fastener. In this manner, the jacket member is permitted to rotate about the shoulder portion of the fastener to prevent frictional transmittal to and action upon the fastener by action exteriorly upon the jacket member.

The snap arrangement includes an annular channel formed in the interior wall surface of the housing portion and an annular rib formed on the outer annular surface of the cap member for engagement in the channel. The jacket and cap members are formed of a resilient material, preferably a common plastic material, such that the housing portion of the jacket member is resiliently expandable outwardly and the cap member is resiliently deformable to facilitate assembling passage of the cap member and its rib into the opening of the jacket member for engagement of the annular rib in the channel. Preferably, the channel is generally rounded in cross-section and the rib is generally square in cross-section for providing a relatively tight interference fit therebetween the insure secure gripping engagement between the jacket member and the cap member. In addition, the opening through the jacket member is frusto-conical in shape such that the annular interior surface of the housing portion extends taperingly inwardly toward the collar portion, and the cap member similarly is frusto-conical in shape with its outer annular surface extending at a slightly smaller taper than that of the annular interior surface of the housing portion, whereby a supplementary interference fit is achieved between such surfaces of the jacket and cap members to enhance the gripping engagement therebetween. In the preferred embodiment, the annular interior surface of the housing portion is tapered at an angle of approximately 3° and the outer annular surface of the cap member is tapered at an angle of approximately 2.5°.

To facilitate authorized removal of the cap member when necessary or desireable, the cap member is provided with a central opening extending partially longitudinally therethrough from its lower surface for orientation inwardly of the jacket member in assembled relation of the cap member therewith. The cap member is adapted to be penetrated from its upper exteriorly-exposed surface in alignment with the opening to permit extension therethrough of a special compatible tool adapted for selective expansion to engage the inward surface of the cap member transversely of its central opening such that the cap member may then be separated from the jacket member by exerting a pulling force on the tool.

BRIEF DESCRIPTION OF THE DRAWINGS

FIG. 1 is a perspective view of a representative utility usage meter device with which two embodiments of the anti-tamper apparatus of the present invention are employed in conjunction with securing bolts for two respective cover plates thereof;

FIG. 2 is an exploded perspective view of the anti-tamper device of one embodiment of FIG. 1;

FIG. 3 is a partially exploded vertical cross-sectional view of the anti-tamper device of FIG. 2 taken along line 3—3 thereof;

FIG. 4 is a vertical cross-sectional view of the anti-tamper device of FIG. 2 in assembled form;

DESCRIPTION OF THE PREFFERED EMBODIMENT

Figure 5:
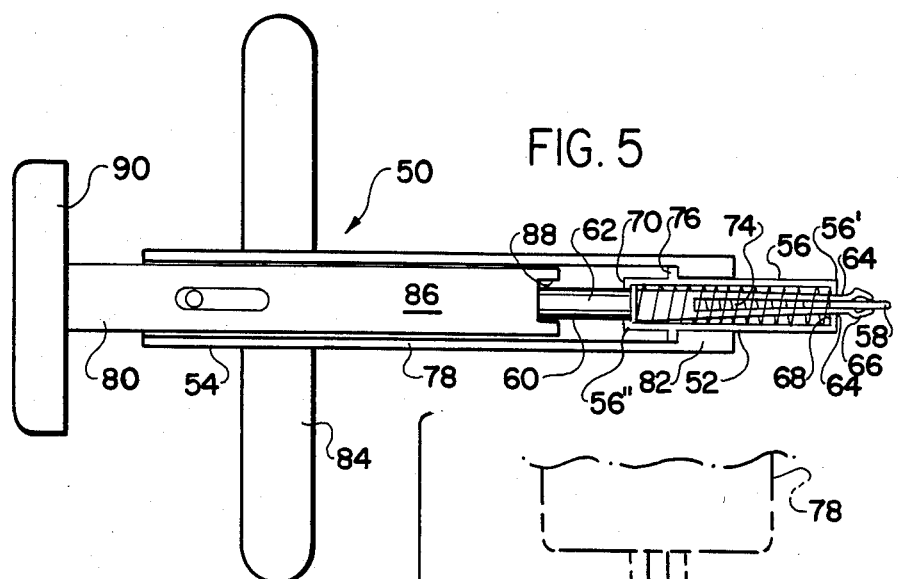
FIG. 5 is a vertical cross-sectional view of a specially designed tool for disassembly of the anti-tamper apparatus of the present invention.
Figure 6:
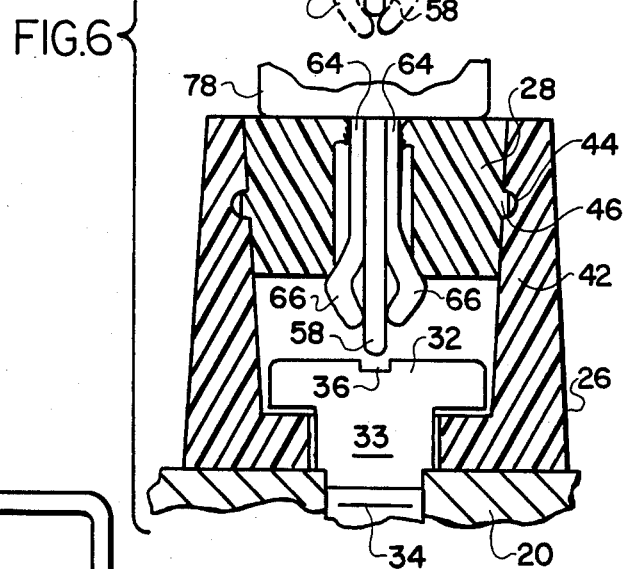
FIG. 6 is a vertical cross-sectional view similar to FIG. 4 of the assembled anti-tamper apparatus of FIG. 2 showing the manner of use of the tool of FIG. 5 for disassembly of the apparatus.

Referring now to the accompanying drawings and initially to FIG. 1, there is indicated generally at 10 a conventional utility usage meter device of the type ordinarily employed by natural gas utility companies in the individual natural gas flow lines to each particular usage location or customer for monitoring the quantity of natural gas consumed at such location or by such customer. For this purpose, the meter device 10 is provided with an internal conduit and valve arrangement (not shown) with which a measuring device (also not shown) is operatively associated for measuring the quantity of natural gas flowing through the metering device and registering same by a dial assembly 12 mounted on the outer casing 14 of the meter device 10. A transparent cover plate 16 is bolted to the outer casing 14 of the meter device 10 over the dial assembly 12 to shield it from damage by weather or otherwise while permitting reading thereof. To permit access to the internal conduit and valve arrangement and other internal components of the meter device 10, and access opening 18 is provided in the top surface of the casing 14, over which access opening 18 a cover plate 20 is ordinarily bolted to the casing 14.

Over recent years, natural gas utility companies have increasingly experienced the problem of customers removing one or both of the cover plates 16, 20 and tampering with one or both of the dial assembly 12 and the internal components of the meter device 10 in attempting to alter the readings of the dial assembly 12 to reflect a less than actual consumption of natural gas. As a solution to this problem, the present invention provides a novel apparatus for enclosing and shielding the securing bolts of the coverplates 16, 20 to prevent access thereto so that the cover plates 16, 20 cannot be removed using ordinary tools. Two embodiments of the anti-tamper apparatus of the present invention are herein described and illustrated, one form of the anti-tamper apparatus being shown in FIG. 1 generally at 22 in assembly with the securing bolts for the cover plate 20 and the other form of the anti-tamper apparatus being shown in FIG. 1 generally at 24 as an integral component of the cover plate 16 for shielding its securing bolt.

The anti-tamper apparatus 22 may best be seen in FIGS. 2–5 and basically includes a jacket member 26 and a cap member 28 dimensioned and configured matingly for assembly with a conventional shoulder bolt 30 or similar fastener in fastening use thereof for enclosing the bolt to prevent access thereto. As will be understood, the shoulder bolt 30 is of the conventional type having an enlarged head 32, a shoulder portion 33 adjacent thereto, and a longitudinal stem 34 extending therefrom. In conventional manner, the head 32 is provided with a slot 36 or is formed of a geometric configuration to facilitate receipt of a screwdriver, wrench or other conventional tool for driving rotation of the bolt 30, the shoulder portion 33 is cylindrical in shape and of a cross-sectional area reduced from the head 32, and the stem 34 is threaded to facilitate penetrating engagement within a structure to which the bolt is to be fastened.

The jacket member 26 is formed as a circular frustum having a circular opening 38 centrally therethrough. The jacket member 26 includes an annular collar portion 40 which extends radially inwardly from one end thereof constructing the opening 38 at 38', with the body of the jacket member 26 forming an annular housing portion 42. The collar portion 40 is of an axial thickness slightly less than the axial length of the shoulder portion 33 of the bolt 30 and the constricted opening 38' defined by a collar portion 40 is of a diameter slightly greater than the shoulder portion 33 of the bolt 30. The jacket member 26 is formed of a frusto-conical exterior shape tapered slightly inwardly from the collar portion 40 to the opposite free end of the housing portion 42, and its central opening 38 is of a reversed frusto-conical shape tapered slightly inwardly from the free end of the housing portion toward the collar portion 40. Preferably, the taper of each such interior and exterior surface of the jacket member 26 is formed at approximately 3 degrees relative to the access of the jacket member 26. An annular recessed channel 44 of a rounded cross-sectional shape is formed circularly in the interior wall surface of the housing portion 42 coaxially therewith at a relatively small spacing from the free end of the housing portion 42 opposite its collar portion 40. Preferably, the jacket member 26 is molded of a conventional thermoplastic polymeric material curable to a relatively hard but resilient condition. In this regard, the aforementioned converging frusto-conical shapes of the interior and exterior surfaces of the housing portion 42 will be understood to provide a decreasing cross-sectional thickness to the housing portion 42 permitting easy release of the jacket member 26 from a forming mold and also permitting resilient radially outward flexure of the housing portion 42 of the finished jacket member 26 for purposes hereinafter more fully described.

The cap member 28 is also of a frusto-conical shape, having a diameter at its largest radial face 28' slightly greater than the largest diameter of the opening 38 of the jacket member 26 at the outer free end of its housing portion 42 and tapering longitudinally therefrom at an angle slightly smaller than the taper angle of the interior wall surface of the housing portion 42 defining the opening 38, preferably at approximately 2.5 degrees to the axis of the cap member 28. A projecting annular rib 46 of a substantially square cross-sectional shape is formed on the outer annular periphery of the cap member 28 co-axially therewith at a distance from the larger end 28' of the cap member 28 equal to the distance by which the channel 44 of the jacket member 26 is spaced from the outer free end of its housing portion 42, and extends outwardly from the peripheral surface of the cap member 28 to a diameter slightly greater than the diameter of the radial face 28'. A cylindrical opening 48 extends axially through the center of the cap member 28 from its radial face 28'' at its smaller end to a substantial depth, preferably more than 75 percent of the axial length of the cap member 28.

In use of the present anti-tamper apparatus, the jacket member 26 is first assembled with the bolt 30 by insertion of the bolt stem 34 through the opening 38 at the free outer end of the housing portion 42 and then through the constricted opening 38' of the collar portion 40 until the shoulder portion 33 is positioned within such constricted opening 38' with the underside of the bolt head 32 resting against the inner radial surface of the collar portion 40. The bolt 30 is then installed in its usual manner in a threaded or other appropriate receiving opening, e.g. openings tapped in the outer casing 14 of the meter device 10 about its access opening 18. As the bolt 30 is tightened into its desired installed disposition, the shoulder portion 33 engages the casing 14 or other structure to which the bolt 30 is installed, with the enlarged bolt head 32 cooperatively acting to retain the collar portion 40 of the jacket member 26 in place against the casing 14. Notably, however, the aforedescribed dimensional differences between the shoulder portion 33 and the constricted opening 38' of the collar portion 40 prevent the bolt head 32 and the shoulder portion 33 from clamping the jacket member 26 rigidly in place but instead permit the jacket member 26 sufficient freedom to rotate by its collar portion 40 about the shoulder portion 33 of the bolt 30. Thus, there is prevented the possibility of rotational untightening and removal of the bolt 30 through frictional transmittal to its head 32 of action thereon by clamping engagement of the outer periphery of the jacket member 26 utilizing pliers, a wrench or other conventional tool, which would be possible and would enable circumvention of the present apparatus if the bolt 30 were utilized to clamp the jacket member 26 in place.

Following the installation and the tightening of the bolt 30, the cap member 28 is assembled with the jacket member 26 by insertion of the smaller end 28'' of the cap member 28 into the opening 38 in the free outer end of the jacket member 26 and driving the cap member 28 into the opening 38 with a hammer or other blunt instrument until the cap member 28 is flush with the outer edge of the housing portion 42 of the jacket member 26.

As this process of assembly is effected, the resiliency of the material of the jacket and cap members 26, 28 permits the housing portion 42 of the jacket member 26 to flexibly expand outwardly and the cap member 28 to be compressingly deformed inwardly to compensate for the greater diametric dimensions of the cap member 28 and its rib 46, thereby permitting passage of the cap member 28 into the opening 38. When the cap member 28 is brought flush with the outer edge of the housing portion 42, the rib 46 of the cap member 28 becomes seated in the channel 44 of the jacket member 26 by a snap-fit effected by a partial release of the spring tension loaded in the jacket and cap member 26, 28 under their aforedescribed flexure. Notably, the difference in the shapes of the square rib 46 and the rounded channel 44 serve to effect an interference fit therebetween which maintains a certain degree of resilient spring tension between the cap member 28 and the housing portion 42 greater than would occur if the rib 46 and channel 44 were of conforming shapes. Furthermore, the greater diametric dimensions of the cap member 28 than the opening 38 of the housing portion 42 at the location of their surface engagement and the smaller tapering angle of the outer peripheral surface of the cap member 28 as compared to the tapering angle of the interior wall surface of the housing portion 42 effect a supplemental resilient frictional interference fit between the outer annular surface of the cap member 28 and the interior wall surface of the housing portion 42. As will be understood, other cross-sectional configurations of the rib 46 and the channel 44 and other tapering angles of the outer surface of the cap member 28 and the inner wall surface of the housing portion 42 may be equally well employed without departing from the substance or scope of the present invention.

In this manner, the cap member is securely fitted matingly with the jacket member 26 to enclose entirely the head 32 of the bolt 30 and to shield it from access thereto. The flush relative condition of the jacket and cap members 26, 28 together with the relatively smooth and rounded exterior surfaces thereof provide no ready manner of disassembly of the jacket and cap member 26, 28 without destroying or at least damaging one or both thereof to an extent that would be readily detectable. In fact, in prototype models of the present apparatus constructed of sizes adapted for use with ordinary bolts in the range of 0.25 inches in diameter, extraction of the cap member 28 from the jacket member 26 requires a pulling force exerted axially of the cap member 28 and the opening 38 of approximately 80 pounds or greater. Thus, it will be understood that unauthorized disassembly of the jacket and cap members 26, 28 is extremely difficult. Furthermore, as previously indicated, the facility of the jacket member 26 for rotation about the bolt 30 prevents unauthorized untightening action on the bolt 30 by friction upon rotation of the jacket member 26. To enhance the noticeability of tampering with the present anti-tamper apparatus, it is contemplated that the cap member 28 may be formed of a different, relatively bold color from the jacket member 26 to make readily noticeable its absence when removed.

Figure 7:
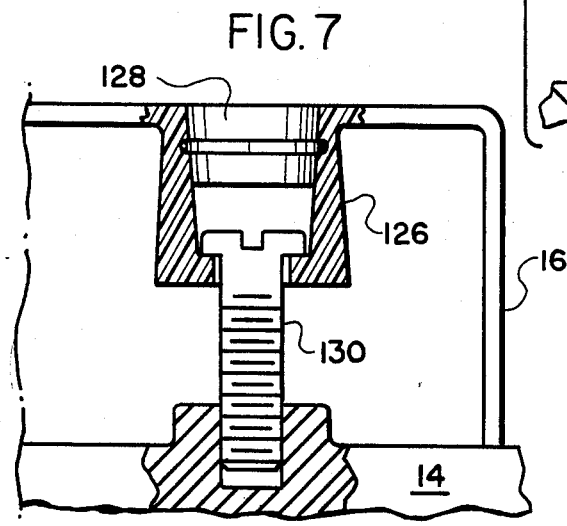
FIG. 7 is a vertical cross-sectional view of the other embodiment of the anti-tamper apparatus of the present invention shown in FIG. 1 taken along line 7—7 thereof.

The anti-tamper apparatus of the second embodiment of the present invention may best be seen in FIG. 7. The anti-tamper apparatus 24 also includes a jacket member 126 and a cap member 128 substantially identical in construction as the jacket and cap members 26, 28 of the anti-tamper apparatus 22. However, in this embodiment of the present invention, the jacket member 126 is molded integrally as part of a member intended to be affixed in place by the associated bolt 130, e.g. the dial cover plate 16 of the meter device 10. Otherwise, the construction of the jacket and cap members 126, 128 is not different from the jacket and cap members 26, 28 and their manner and effect of assembled use and operation is the same as above-described.

Notably, however, in the embodiment of the anti-tamper apparatus 24, it is not necessary to employ a special shoulder bolt 30 since the body of the dial cover plate 16 or other member with which the jacket member 126 is integrally molded will prevent frictional untightening of the bolt 130. Therefore, it is preferred in this embodiment that an ordinary bolt 130 be employed and be tightened into clamping engagement with the jacket member 126 to fix it and the dial cover plate 16 rigidly in place on the casing 14.

Because of the strength of the fit between the jacket and cap members of the present anti-tamper apparatus 22, 24, the present invention also provides a special tool, illustrated in FIG. 5 and indicated therein generally at 50, particularly designed for the removal of the cap-member 28 from the jacket member 26. The tool 50 basically includes a conventional spring-loaded gripping device 52 manufactured by Kwick-Lock Industries, Corp. of Los Angeles, Calif., under the brand designation CLECO housed within an operating handle assembly 54 for the selective actuation of the gripping device 52. The gripping device 52 includes a generally tubular housing 56 in one end 56' of which is affixed a linear bar 58 to project axially outwardly from the end 56'. A plunger rod 60 having a cylindrical body portion 62 from which axially extend a pair of parallel spring arms 64 is disposed axially within the housing 56 with the spring arms 64 flanking opposite sides of the longitudinal bar 58 and extending therewith from the end 56' of the housing 56 and with the body portion 62 extending outwardly from the opposite end 56" of the housing 56. The free extending ends of the spring arms 64 are provided on their respective outwardly facing surfaces with a notched configuration forming jaw portions 66. The housing 56 has an annular constriction at its end 56' forming a shoulder 68 and has another annular constriction adjacent its opposite end 56" forming another shoulder 70. The cylindrical body portion 62 of the plunger rog 60 has an annular rib 72 disposed inwardly of the shoulder 70. A coil spring 74 is positioned to extend between the shoulder 68 of the housing 56 and the rib 72 of the plunger rod 60 to urge the housing 56 and the plunger rod 60 into a normal relative disposition with the rib 72 of the plunger rod in abuttment with the shoulder 70 of the housing wherein the longitudinal bar 58 of the housing 56 is disposed between the spring arms 64 to maintain them apart. To best facilitate the assembly of the components of the gripping device 52 in their described relationships, the housing 56 is constructed in two tubular pieces crimped or otherwise affixed together at 76 by abutting outer annular flanges. As will be understood, movement of the plunger rod 60 against the biasing force of the spring 74 causes movement of the spring arms 64 outwardly past the longitudinal bar 58 to permit their spring tendency to cause them to move together.

The handle assembly 54 includes a sleeve member 78 adapted to contain the gripping device 52 and an operating plunger 80 slidable in the sleeve member 78 for actuating the aforedescribed movement of the plunger rod 60 of the gripping device 52. The sleeve member 78 is of a tubular cylindrical construction with an annular constriction at one end forming a shoulder 82 against which the outer flange 76 of the housing 56 of the gripping device 52 abuts with the end 56' of the housing 56 extending axially outwardly from the sleeve member 78. A pair of arms 84 extend perpendicularly outwardly from opposite sides of the sleeve member 78 at its opposite end. The operating plunger 80 includes a cylindrical shaft 86 of a slightly smaller diameter than the inner diameter of the sleeve member 78 to fit slidably therein and has a recess 88 formed centrally in its lower end surface to received the projecting end of the plunger rod 60 of the gripping device 52. A rounded knob 90 is affixed to the projecting end of the shaft 86 for ease of operation thereof. The handle assembly 54 is constructed of a size readily capable of holding in one's hand for manual actuation. More specifically, the handle assembly 54 is constructed such that the knob 90 may be held in the palm of the hand and the arms 84 may be grasped by the fingers. Thus, by manually drawing the arms 84 toward the knob 90 by closing the fingers, the shaft 86 may be pushed into the sleeve member 78, thereby causing the aforedescribed operation of the gripping device 52 to extend its spring arms 64 outwardly. Release of the arms 84 permits the gripping device 52 to return to its normal condition, thereby also returning the handle assembly 54 to its normal condition.

The operation of the tool 50 will thus be understood. when it becomes desirable or necessary to remove the cap member 28 for access to the bolt 30, the cap member 28 is initially prepared for operation thereon by the gripping device 52 by formation of a small hole centrally through the outer face 28' of the cap member 28 to the terminal end of the central opening 48 of the cap member 28 to provide a complete axial opening therethrough. The hole should be smaller in diameter than the opening 48 and, therefore, should preferably be made using a conventional scribe, ice pick or the like. The handle assembly 54 of the tool 50 is then manually operated by its arms 84 and knob 90 in the aforedescribed manner to extend the spring arms 64 of the gripping device 52 until touching together beyond the longitudinal bar 58. While maintaining the spring arms 64 thusly extended, the arms 64 are inserted through the just-formed hole in the cap member 28 until the jaw portions 66 at the projecting ends of the arms 64 are disposed within the original opening 48 of the cap member 28, preferably until the arms 64 are felt to touch the bolt head 32. Thereupon, the manual force retaining the arms 84 and knob 90 of the handle assembly 54 together is released causing the spring arms 64 to withdraw to their original disposition about the longitudinal bar 58, thereby being held apart to a sufficient extend to prevent their withdrawal from the cap member 28. Upon outward pulling of the sleeve member 78 of the tool 50 axially of the cap member 28, the jaw portions 66 of the spring arms engage the terminal end of the opening 48 in the cap member 28 adjacent the just-formed hole and, accordingly, the cap member 28 may then be extracted from the jacket member 26 by pulling the tool 50 by its arms 84 (without depression of the knob 90) with sufficient force to overcome the spring and frictional forces effecting the snap-fit connection between the jacket and cap members 26, 28. As will be understood, relatively little exertion is required to generate such pulling force using the tool 50, but the extraction operation would be extremely difficult without the tool 50.

In summary, the apparatus of the present invention will be understood to provide several important advantages. First and most apparent, the present apparatus is effective to completely enclose the operating head of a bolt or other fastener to shield it from access and therefore to prevent unauthorized removal thereof or tampering therewith. The snap connection between the jacket and cap members of the present apparatus is a substantially strong one employing an interference fit utilizing both spring and frictional forces rendering it virtually impossible to separate the members using ordinary conventional tools without damaging or destroying the members. However, the present invention also provides a special tool by which the jacket and cap members may be readily disassembled. Furthermore, the construction of the jacket and cap members is particularly designed to facilitate easy molding thereof of conventional material, making the present apparatus relatively inexpensive to produce.

Those persons skilled in the art will understand that the present apparatus is of substantially broad utility susceptible of use in virtually any embodiment wherein it is desirable to shield a bolt, screw or other fastener from unauthorized access. Accordingly, while the present apparatus has been disclosed as preferaby embodied for use with utility usage meter devices, it is to be understood that the present invention is not limited thereto, the present disclosure of the preferred embodiment of the present invention being made solely for illustrative purposes in providing an enabling disclosure to the skill of the art. Furthermore, it will be understood that variations or modifications may be made in the construction of the members of the present apparatus as previously indicated without departing from the substance or scope of the presnt invention. All modifications, variation, adaptations, and equivalent arrangements of the present apparatus which would be reasonably apparent from the foregoing disclosure are considered to be within the scope and substance of the present invention which is to be limited only by the claims appended hereto.

I claim:

1. Apparatus for assembly with a fastener of the type having a stem and an enlarged head during use of said fastener for deterring and detecting tampering therewith, said apparatus comprising annular collar means for extension therethrough of said fastener stem and for disposition adjacent the underside of said fastener head, closure means mated with said collar means for cooperatively enclosing said fastener head to prevent access thereto, and resilient snap means on said collar means and said closure means for deforming engagement therebetween for gripping affixation thereof together by a resilient interference-type snap-fit thereby for shielding said fastener head for preventing unauthorized access thereto without detectably damaging one or both said collar means and said closure means, said collar means including an annular housing portion extending therefrom for receiving and encircling said fastener head and said closure means being adapted to fit interiorly of said housing portion, an annular channel being formed on the interior annular surface of said housing portion and an annular rib being formed on the outer annular surface of said closure means for engagement in said channel, said channel being generally rounded in cross-section and said rib being generally square in cross-section and said channel and said rib being cooperatively dimensioned for seating of said rib in said channel and deformation of said rib in partial conformity with said channel for providing a relatively tight interference fit therebetween to provide a secure gripping engagement therebetween, said interior annular surface of said housing portion extending taperingly inwardly toward said collar means and said outer annular surface of said closure means extending at a slightly smaller taper for a supplementary interference fit between said interior annular surface of said housing portion and said outer annular surface of said closure means in the affixed relation of said collar means and said closure means to enhance the gripping engagement therebetween, said closure means having an area of reduced cross-section adapted to be penetrated to facilitate authorized removal of said closure means and to indicate visually when unauthorized tampering has occurred.

2. Apparatus according to claim 1 and characterized further in that said snap means is adapted for affixing said collar means and said closure means with their adjacent exterior surfaces in flush relation.

3. Apparatus according to claim 1 an characterized further by a fastener having a stem for extension through said collar means and an enlarged head for disposition with its underside adjacent said collar means, and characterized further in that said annular collar means is adapted cooperatively with said fastener for rotation thereabout to prevent frictional transmittal to and action upon said fastener by action upon said collar means or said closure means.

4. Apparatus for assembly with a fastener of the type having a stem and an enlarged head during use of said fastener for deterring and detecting tampering therewith, said apparatus comprising a jacket member having a housing portion having an opening therethrough for receiving said fastener head to be encircled by said housing portion and having an annular collar portion constricting said opening for extension through said collar portion of said fastener stem and for disposition of said collar portion adjacent the underside of said fastener head, a cap member adapted to fit in said opening of said housing portion in flush relation therewith for enclosing said fastener head therein, and resilient snap means on said housing portion of said jacket member and on said cap member for deforming engagement therebetween for gripping affixation thereof together by a resilient interference-type snap fit, said snap means including an annular channel formed in the interior wall surface of said housing portion and an annular rib formed on the outer annular surface of said cap member for engagement in said channel, said housing portion being resiliently expandable outwardly and said cap member being resiliently deformable for passage of said cap member into said opening of said jacket member and said rib into said channel, said channel being generally rounded in cross-section and said rib being generally square in cross-section and said channel and rib being cooperatively dimensioned for seating of said rib in said channel and deformation of said rib in partial conformity with said channel for providing a relatively tight interference fit therebetween for secure gripping engagement between said jacket member and said cap member, said interior annular surface of said housing portion extending taperingly inwardly toward said collar portion and said outer annular surface of said cap member extending at a slightly smaller taper for a supplementary interference fit therebetween for causing deformation thereof to enhance the gripping engagement between said jacket member and said cap member, thereby for shielding said fastener head for preventing access thereto without detectably damaging one or both said jacket member and said cap member.

5. Apparatus according to claim 4 and characterized further in that said annular interior surface of said housing portion is substantially frusto-conical in shape and said cap member is substantially frusto-conical in shape with its outer annular surface tapered at an angle relative to the axis of said cap member slightly smaller than the conical taper angle of said housing portion relative to its axis.

6. Apparatus according to claim 5 and characterized further in that said housing portion is tapered at an angle of approximately three (3) degrees relative to its axis and said outer annular surface of said cap member is tapered at an angle of approximately two and one-half (2.5) degrees relative to its axis.

7. Apparatus according to claim 4 and characterized further in that said cap member includes a central opening extending partially longitudinally therethrough for orientation inwardly of said jacket member in assembled relation of the cap member therewith and said cap member is adapted to be penetrated in alignment with said opening for extension therethrough of compatible tool means adapted for selective expansion to engage the surface of said cap member transversely of its said central opening for authorized removal of said cap member.

8. Apparatus according to claim 4 and characterized further by a fastener having a stem for extension through said collar portion, an enlarged head for disposition with its underside adjacent said collar portion, and a shoulder portion intermediate its said enlarged head and its said stem and of a reduced cross-sectional size from said head for disposition with said collar portion, and said collar portion of said jacket member is of an axial dimension slightly smaller than said shoulder portion and of a radial dimension slightly greater than said shoulder portion but less than said enlarged head to permit said jacket member to rotate by its said collar portion about said shoulder portion of said fastener to prevent frictional transmittal to and action upon said fastener by action exteriorly upon said jacket member.

9. Apparatus according to claim 4 and characterized further by a fastener having a stem for extension through said collar portion and an enlarged head for disposition with its underside adjacent said collar portion, and characterized further in that said annular collar portion is adapted cooperatively with said fastener for rotation of said jacket member thereabout to prevent frictional transmittal to and action upon said fastener by action upon said jacket member or said cap member.

10. Apparatus for asesmbly with a fastener of the type having a stem and an enlarged head during use of said fastener for deterring and detecting tampering therewith, said apparatus comprising a jacket member having a housing portion having an opening therethrough for receiving said fastener head to be encircled by said housing portion and having an annular collar portion constricting said opening for extension through said collar portion of said fastener stem and for disposition of said collar portion adjacent the underside of said fastener head, a cap member adapted to fit in said opening of said housing portion in flush relation therewith for enclosing said fastener head therein, and resilient snap means on said housing portion of said jacket member and on said cap member for deforming engagement therebetween for gripping affixation thereof together by a resilient interference-type snap fit, said snap means including an annular channel formed in the interior wall surface of said housing portion and an annular rib formed on the outer annular surface of said cap member for engagement in said channel, said housing portion being resiliently expandable outwardly and said cap member being resiliently deformable for passage of said cap member into said opening of said jacket member and said rib into said channel, said channel and said rib being of contrasting cross-sectional shapes and being cooperatively dimensioned for seating of said rib in said channel and deformation of said rib in partial conformity with said channel for providing a relatively tight interference fit therebetween for secure gripping engagement between said jacket member and said cap member, said interior annular surface of said housing portion extending taperingly inwardly toward said collar portion and said outer annular surface of said cap member extending at a slightly smaller taper for a supplementary interference fit therebetween for causing deformation thereof to enhance the gripping engagement between said jacket member and said cap member, thereby for shielding said fastener head for preventing access thereto without detectably damaging one or both said jacket member and said cap member.

11. Apparatus according to claim 10 and characterized further in said said annular interior surface of said housing portion is substantially frusto-conical in shape and said cap member is substantially frusto-conical in shape with its outer annualr surface tapered at an angle relative to the axis of said cap member slightly smaller than the conical taper angle of said housing portion relative to its axis.

12. Apparatus according to claim 10 and characterized further in that said cap member includes a central opening extending partially longitudinally therethrough for orientation inwardly of said jacket member in assembled relation of the cap member therewith and said cap member is adapted to be penetrated in alignment with said opening for extension therethrough of compatible tool means adapted for selective expansion to engage the surface of said cap member transversely of its said central opening for authorized removal of said cap member.

13. In combination with a utility meter or the like having a usage measuring assembly, a cover member for protection of said measuring assembly and a fastener of the type having a stem and an enlarged head holding said cover member in place, the improvement comprising apparatus formed integrally with said cover member for receiving said fastener for deterring and detecting tampering therewith, said apparatus comprising a jacket member having a housing portion having an opening therethrough for receiving said fastener head to be encircled by said housing portion and having an annular collar portion constricting said opening for extension through said collar portion of said fastener stem and for disposition of said collar portion adjacent the underside of said fastener head, a cap member adapted to fit in said opening of said housing portion in flush relation therewith for enclosing said fastener head therein, and resilient snap means on said housing portion of said jacket member and on said cap member for gripping affixation thereof together by a resilient snap fit, said snap means including an annular channel formed in the interior wall surface of said housing portion and an annular rib formed on the outer annular surface of said cap member for engagement in said channel, said housing portion being resiliently expandable outwardly and said cap member being resiliently deformable for passage of said cap member into said opening of said jacket member and said rib into said channel, said channel being generally rounded in cross-section and said rib being generally square in cross-section and said channel and rib being cooperatively dimensioned for seating of said rib in said channel and deformation of said rib in partial conformity with said channel for providing a relatively tight interference fit therebetween for secure gripping engagement between said jacket member and said cap member, said interior annular surface of said housing portion extending taperingly inwardly toward said collar portion and said outer annular surface of said cap member extending at a slightly smaller taper for a supplementary interference fit therebetween for causing deformation thereof to enhance the gripping engagement between said jacket member and said cap member, thereby for shielding said fastener head for preventing access thereto without detectably damaging one or both said jacket member and said cap member.

14. Apparatus for assembly with a fastener of the type having a stem and an enlarged head during use of said fastener for deterring and detecting tampering therewith, said apparatus comprising a jacket member having a housing portion having an opening therethrough for receiving said fastener head to be encircled by said housing portion and having an annular collar portion constricting said opening for extension through said collar portion of said fastener stem and for disposition of said collar portion adjacent the underside of said fastener head, a cap member adapted to fit in said opening of said housing portion for enclosing said fastener head therein, and resilient snap means on said housing portion of said jacket member and on said cap member for deforming engagement therebetween for gripping affixation thereof together by a resilient interference-type snap fit, said snap means including an annular channel formed in one of the interior wall surface of said housing portion and the outer annular surface of said cap member and an annular rib formed in the other of said interior wall surface of said housing portion and said outer annular surface of said cap member for engagement in said channel, said housing portion being resiliently expandable outwardly and said cap member being resiliently deformable for passage of said cap member into said opening of said jacket member and said rib into said channel, said channel and rib being cooperatively dimensioned for seating of said rib in said channel in at least partial conformity with said channel for providing a relatively tight frictional fit therebetween for secure gripping engagement between said jacket member and said cap member, said interior annular surface of said housing portion and said outer annular surface of said cap member extending at differing relative angles for an interference fit therebetween for causing deformation thereof to enhance the gripping engagement between said jacket member and said cap member, thereby for shielding said fastener head for preventing access thereto without detectably damaging one or both said jacket member and said cap member.

15. Apparatus according to claim 14 and characterized further in that said channel is formed in said interior wall surface of said housing portion and said rib is formed in the outer annular surface of said cap member.

16. Apparatus according to claim 15 and characterized further in that said rib and said channel are formed of contrasting cross-sectional shapes for providing a relatively tight interference fit therebetween.

17. Apparatus according to claim 16 and characterized further in that said channel is generally rounded in cross-section and said rib is generally square in cross-section.

18. Apparatus according to claim 14 and characterized further in that said interior annular surface of said housing portion extends taperingly inwardly toward said collar portion and said outer annular surface extends at a slightly smaller taper.

19. Apparatus according to claim 14 and characterized further by a fastener having a stem for extension through said collar portion and an enlarged head for disposition with its underside adjacent said collar portion, and characterized further in that said annular collar portion is adapted cooperatively with said fastener for rotation of said jacket member thereabout to prevent frictional transmittal to and action upon said fastener by action upon said jacket member or said cap member.

20. In combination with a utility meter or the like having a usage measuring assembly, a cover member for protection of said measuring assembly and a fastener of the type having a stem and an enlarged head holding said cover member in place, the improvement comprising apparatus formed integrally with said cover member for receiving said fastener for deterring and detecting tampering therewith, said apparatus comprising a jacket member having a housing portion having an opening therethrough for receiving said fastener head to be encircled by said housing portion and having an annular collar portion constricting said opening for extension through said collar portion of said fastener stem and for disposition of said collar portion adjacent the underside of said fastener head, a cap member adapted to fit in said opening of said housing portion for enclosing said fastener head therein, and resilient snap means on said housing portion of said jacket member and on said cap member for gripping affixation thereof together by a resilient snap fit, said snap means including an annular channel formed in one of the interior wall surface of said housing portion and the outer annular surface of said cap member and an annular rib formed in the other of said interior wall surface of said housing portion and said outer annular surface of said cap member for engagement in said channel, said housing portion being resiliently expandable outwardly and said cap member being resiliently deformable for passage of said cap member into said opening of said jacket member and said rib into said channel, said channel an rib being cooperatively dimensioned for seating of said rib in said channel in at least partial conformity with said channel for providing a relatively tight frictional fit therebetween for secure gripping engagement between said jacket member and said cap member, said interior annular surface of said housing portion and said outer annular surface of said cap member extending at differing relative angles for an interference fit therebetween for causing deformation thereof to enhance the gripping engagement between said jacket member and said cap member, thereby for shielding said fastener head for preventing access thereto without detectably damaging one or both said jacket member and said cap member.

21. The combination of claim 20 and characterized further in that said channel is formed in said interior wall surface of said housing portion and said rib is formed in the outer annular surface of said cap member.

22. The combination of claim 21 and characterized further in that said rib and said channel are formed of contrasting cross-sectional shapes for providing a relatively tight interference fit therebetween.

23. The combination of claim 22 and characterized further in that said channel is generally rounded in cross-section and said rib is generally square in cross-section.

24. The combination of claim 20 and characterized further in that said interior annular surface of said housing portion extends taperingly inwardly toward said collar portion and said outer annular surface extends at a slightly smaller taper.

25. The combination of claim 20 and characterized further by a fastener having a stem for extension through said collar portion and an enlarged head for disposition with its underside adjacent said collar portion, and characterized further in that said annular collar portion is adapted cooperatively with said fastener for rotation of said jacket member thereabout to prevent frictional transmittal to and action upon said fastener by action upon said jacket member or said cap member.

* * * * *

UNITED STATES PATENT AND TRADEMARK OFFICE
CERTIFICATE OF CORRECTION

PATENT NO. : 4,621,230

DATED : November 4, 1986

INVENTOR(S) : Jack S. Crouch, Edward F. Zink

It is certified that error appears in the above-identified patent and that said Letters Patent is hereby corrected as shown below:

Col. 1, line 7, delete "an" and insert therefor — and —.

Col. 2, line 56, delete "the" and insert — to —.

Col. 3, line 65, delete "and" and insert — an —.

Col. 4, line 43, delete "constructing" and insert — constricting —.

Col. 6, line 13, delete "member" and insert — members —.

Col. 6, line 30, delete "cross-sectionalconfigurations" and insert — cross-sectional configurations —.

Col. 7, line 5, delete "not" and insert — no —.

Col. 10, line 22, delete "an" and insert — and —.

Col. 11, line 36, delete "with" and insert — within —.

Col. 14, line 53, delete "an" and insert — and —.

Signed and Sealed this

Seventeenth Day of April, 1990

*Attest:*

HARRY F. MANBECK, JR.

*Attesting Officer*      *Commissioner of Patents and Trademarks*